US012304862B2

(12) United States Patent
Moser et al.

(10) Patent No.: US 12,304,862 B2
(45) Date of Patent: May 20, 2025

(54) CONDUCTIVE MORTAR

(71) Applicant: SIKA TECHNOLOGY AG, Baar (CH)

(72) Inventors: Thomas Moser, Zürich (CH); Jürg Sturzenegger, Wolfhausen (CH); Fabio Würmli, Baar (CH); Steffen Kelch, Oberengstringen (CH)

(73) Assignee: SIKA TECHNOLOGY AG, Baar (CH)

( * ) Notice: Subject to any disclaimer, the term of this patent is extended or adjusted under 35 U.S.C. 154(b) by 806 days.

(21) Appl. No.: 17/609,091

(22) PCT Filed: May 28, 2020

(86) PCT No.: PCT/EP2020/064809
§ 371 (c)(1),
(2) Date: Nov. 5, 2021

(87) PCT Pub. No.: WO2020/239893
PCT Pub. Date: Dec. 3, 2020

(65) Prior Publication Data
US 2022/0212991 A1    Jul. 7, 2022

(30) Foreign Application Priority Data

May 28, 2019  (EP) .................................. 19176999

(51) Int. Cl.
| | | |
|---|---|---|
| C04B 18/06 | (2006.01) | |
| C04B 28/04 | (2006.01) | |
| C04B 111/00 | (2006.01) | |
| C04B 111/60 | (2006.01) | |
| C04B 111/94 | (2006.01) | |

(52) U.S. Cl.
CPC ............ C04B 18/067 (2013.01); C04B 28/04 (2013.01); *C04B 2111/00508* (2013.01); *C04B 2111/60* (2013.01); *C04B 2111/94* (2013.01); *C04B 2201/32* (2013.01)

(58) Field of Classification Search
CPC .................. C04B 18/067; C04B 28/04; C04B 2111/00508; C04B 2111/60; C04B 2201/32; C04B 28/008; C04B 28/00; C04B 26/14; C04B 26/16; C04B 28/006; C04B 28/021; C04B 28/06; C04B 28/065; C04B 24/08; C04B 28/10; C04B 28/14; E04F 13/02; E04F 15/12; E04F 2290/00; Y02P 40/10; Y02W 30/91
See application file for complete search history.

(56) References Cited

U.S. PATENT DOCUMENTS

| | | | | |
|---|---|---|---|---|
| 3,166,518 A | * | 1/1965 | Barnard | ................. C04B 20/10 |
| | | | | 252/511 |
| 3,962,142 A | | 6/1976 | Freeman et al. | |
| 9,802,865 B1 | | 10/2017 | Chau et al. | |
| 10,160,691 B2 | * | 12/2018 | Prat | ........................ C04B 28/16 |
| 2005/0160946 A1 | | 7/2005 | Comrie | |
| 2006/0272551 A1 | | 12/2006 | Comrie | |
| 2016/0260510 A1 | | 9/2016 | Hussin et al. | |

FOREIGN PATENT DOCUMENTS

| | | | | |
|---|---|---|---|---|
| CN | 101113089 A | * | 1/2008 | ........... C04B 18/142 |
| CN | 101250034 A | | 8/2008 | |
| CN | 101456708 A | | 6/2009 | |
| CN | 101525224 A | | 9/2009 | |
| CN | 101698576 A | | 4/2010 | |
| CN | 101712546 A | | 5/2010 | |
| CN | 103224369 A | | 7/2013 | |
| CN | 103469212 A | | 12/2013 | |
| CN | 107814498 A | | 3/2018 | |
| DE | 3733564 C1 | | 12/1988 | |
| DE | 19750162 A1 | | 5/1998 | |
| DE | 19915093 A1 | | 10/2000 | |
| DE | 202005017398 U1 | | 1/2006 | |
| DE | 102014017049 A1 | | 5/2016 | |
| EP | 2476658 A1 | | 7/2012 | |
| EP | 3064480 A1 | | 9/2016 | |
| EP | 3095769 A1 | | 11/2016 | |
| JP | H01148738 A | | 6/1989 | |
| KR | 20030028859 A | | 4/2003 | |
| WO | 2010/017571 A1 | | 2/2010 | |

OTHER PUBLICATIONS

Sharma et al. Durability assessment of self compacting concrete incorporating copper slag as fine aggregates. Construction and Building Materials. 155, 617-629. (Year: 2017).*
Yehia et al. Conductive concrete for cathodic protection of bridge decks. ACI Materials Journal. 107, 577-585. (Year: 2010).*
Dec. 9, 2021 International Preliminary Report on Patentability issued in International Patent Application No. PCT/EP2020/064809.
Gorai et al, "Characteristics and utilisation of copper slag—a review," Resources, Conservation and Recycling, vol. 39, pp. 299-313, 2003.
Oct. 19, 2020 Written Opinion issued in International Patent Application No. PCT/EP2020/064809.

* cited by examiner

*Primary Examiner* — David P Turocy
*Assistant Examiner* — Anastasia A. Kuvayskaya
(74) *Attorney, Agent, or Firm* — Oliff PLC

(57) ABSTRACT

Methods including preparing a mixture including a binder composition containing at least one binder and at least one mineral filler, and curing the mixture to produce a material having improved electrical conductivity at 20° C., where at least 20% by weight of the at least one mineral filler is iron-containing slag.

13 Claims, 1 Drawing Sheet

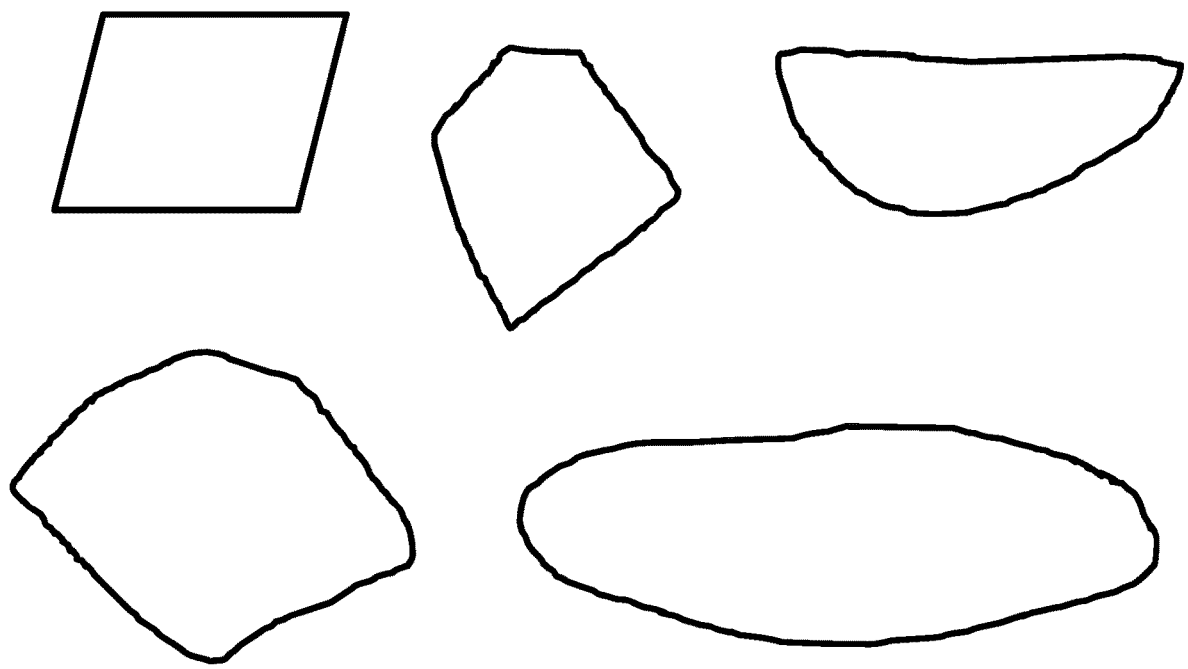

CONDUCTIVE MORTAR

TECHNICAL FIELD

The invention relates to binder compositions having improved electrical conductivity, and also the production thereof and use thereof as mortar, screed, render, grout, coating, equalization composition or for sacrificial anodes.

PRIOR ART

Building materials having electrically conductive properties are prescribed or desirable for many fields. Thus, a good electrical conductivity is required for floors in rooms in which there is an explosion hazard in order to prevent sparking in the event of electrostatic charging. In addition, in rooms in which medical instruments are employed or in regions in which electronic components are produced or used, good electrical conductivity of the floor is necessary in order to avoid electrostatic charging.

For the electrostatic shielding of regions of rooms, too, an electrically conductive and possibly also magnetic building material is advantageous. A floor having good thermal conductivity is advantageous for use in combination with floor heating.

In order to make materials more readily electrically conductive, graphite, carbon black or conductive fibers, e.g. carbon or metal fibers, are typically added.

U.S. Pat. No. 3,962,142 describes a cement-based mixture containing electrically conductive material having a large and small particle size. The electrically conductive material is calcined petroleum coke and acetylene black.

EP 2 476 658 describes a binder mixture for producing thermally conductive screeds. The binder mixture contains from 2 to 3% by weight of graphite which comprises 90% of particles having a size of 125-400 μm.

Carbon black or graphite powder are fine, black, dusty materials whose handling is typically associated with deposition of black dusts in the surroundings. Carbon black and graphite powder can adversely affect the processability of the material and reduce the effectiveness of admixtures. Furthermore, mixing fibers homogeneously into a binder matrix is difficult and the presence of fibers typically adversely affects the processability. The addition of carbon black or graphite powder, carbon fibers or metal fibers also increases the costs of the material.

There continues to be a need for binder compositions for producing materials having improved electrical conductivity, which if possible overcome the abovementioned disadvantages.

BRIEF DESCRIPTION OF THE INVENTION

It is an object of the present invention to provide a binder composition for producing materials having improved electrical conductivity, which composition can be processed well and easily and overcomes the disadvantages of the prior art.

This object is surprisingly achieved by a binder composition as described in claim 1.

Surprisingly, binder compositions containing iron-containing slag display an improved electrical conductivity. Likewise surprisingly, the iron-containing slag can be used in a large amount and without a decrease in quality in the binder composition. The binder composition containing the iron-containing slag displays good properties, in particular high strength and good processability. The properties, in particular the strength, are surprisingly even improved compared to the prior art.

The use of waste products such as slag as filler in binder compositions gives an ecological advantage over the use of specifically treated fillers from natural resources. Firstly, the increasingly scarce natural sources of raw materials are conserved and secondly less landfill space is required for disposal of the waste materials. This is advantageous from economic and environmental points of view.

For certain applications, in particular for the electromagnetic shielding of rooms, it is also advantageous for the electrically conductive material to have additional magnetic properties, which is made possible by the use of iron-containing slag having magnetic properties. For certain applications, in particular for use in combination with floor heating, it is also advantageous for the electrically conductive material to additionally have an improved thermal conductivity.

Further aspects of the invention are subject matter of further independent claims. Particularly preferred embodiments of the invention are subject matter of the dependent claims.

WAYS OF CARRYING OUT THE INVENTION

The invention provides for the use of a binder composition comprising at least one binder and at least one mineral filler for producing materials having improved electrical conductivity at 20° C., characterized in that at least 20% by weight, preferably at least 30% by weight, more preferably at least 40% by weight, even more preferably at least 50% by weight, especially at least 60% by weight, in particular at least 70% by weight, of the mineral filler is iron-containing slag.

An improved electrical conductivity is, for the purposes of the invention, present when, in particular, the electrical resistance of the material containing iron-containing slag is decreased by a factor of at least 1.5 compared to a material which has the same composition but contains silica sand of the same particle size instead of the iron-containing slag. A decreased electrical resistance means a better electrical conductivity.

The binder composition preferably comprises from 30 to 95% by weight, particularly preferably from 40 to 90% by weight, in particular from 50 to 85% by weight, of mineral filler, based on the total weight of the dry binder composition.

The binder composition preferably has a proportion of iron-containing slag of from 10 to 95% by weight, more preferably from 20 to 80% by weight, in particular from 30 to 75% by weight, based on the total weight of the dry binder composition. A high proportion of iron-containing slag improves the conductivity and is therefore particularly advantageous.

In the present document, a "binder" is a pulverulent or liquid material which can be converted by means of a suitable reaction into a solid shaped body. The binder can be present in one-component form, which means that it reacts on addition of water to form a solid, or it can be present in multicomponent form, which means that it reacts after mixing of the components, optionally with addition of water, to form a solid. When the binder is mixed with fillers, it forms a compact material after curing together with the filler. The binder can be a mineral binder or an organic binder, or a combination of a mineral and organic binder.

In the present document, the expression "mineral binder" refers to:
a) a binder which in the presence of water reacts in a hydration reaction to give solid hydrates or hydrate phases. This can be, for example, a hydraulic binder (e.g. cement), a latent hydraulic binder (e.g. finely milled slag sand), a pozzolanic binder (e.g. fly ash) or a nonhydraulic binder (e.g. gypsum plaster).
b) a binder which after curing is a geopolymer. Here, the binder consists of at least one aluminum silicate and at least one alkali metal silicate which after mixing in an aqueous medium react to form a geopolymer.

In the present document, the expression "organic binder" refers to a binder which comprises at least one organic compound and is free of mineral binders. The organic binder is preferably a multicomponent binder and after mixing of the components reacts at 20° C. to give a solid shaped body. Examples of such multicomponent organic binders are curable epoxy resins and suitable hardeners, for example polyamines, which can react to form cured epoxy resins, or polyisocyanates and polyols which can cure to form polyurethanes, or polymerizable monomers such as monomers having a (meth)acrylate basis which can, for example, cure in the presence of polymerization initiators to form (meth) acrylate resins.

In the present document, a "binder composition" is a composition which comprises at least one binder.

In the present document, a "dry binder composition" is a binder composition which does not contain any water.

In the present document, the adjective "iron-containing" refers to a material which comprises at least 5% by weight of iron, with the iron being calculated as FeO, regardless of the compound in which it is present.

In the present document, the "apparent density" is the density of a solid body. The apparent density is given by the ratio of the weight of the solid body and the volume thereof, including the included pore volume.

Slag is typically formed as by-product in the extraction of metals in the smelting of ores, metal recycling or in the incineration of waste. It is a mixture composed mainly of the oxides and silicates of various metals. The chemical composition of slags is typically reported in the form of the oxides of the elements present, regardless of the compounds in which the elements are effectively present. Thus, for example, the content of Si is reported as $SiO_2$, the content of Al as $Al_2O_3$ and the content of Fe as FeO. The percentage of constituents indicated for a composition of slags relates to the percentage of the constituent as its oxide, based on the sum of all constituents in the composition, the weight of which is likewise calculated in the form of their oxides. The main constituents of slags are CaO, $SiO_2$, $Al_2O_3$, MgO and FeO. The proportion of these materials in the various types of slag can be very different. The chemical composition of the slag can be determined by X-ray fluorescence analysis in accordance with DIN EN ISO 12677.

The iron in the slag is typically present as iron compound, for example as iron oxide such as $Fe_3O_4$, $Fe_2O_3$ and/or FeO and/or as iron silicate, for example $Fe_2SiO_4$, with various mixed crystals or mixed phases, including with other metals or nonmetals, likewise being able to be present. The reporting as FeO does not in any way restrict the iron in the slag to this configuration, but rather encompasses all the iron present in the slag regardless of the mineral or compound in which it is present, converted to FeO. Thus, for example, an analytically determined amount of 10 g of iron (Fe) corresponds to an amount of 12.9 g of FeO.

One iron-containing slag is steel slag. It is a by-product of steel recycling or production of steel from pig iron. In contrast to the blast furnace slag (HOS) which is obtained in pig iron production and has a content of iron, calculated as FeO, of typically less than 3% by weight, steel slag contains from about 5 to 45% by weight of iron, calculated as FeO. Steel slag is formed in a number of processes and steps in steel production. Examples of steel slags are basic oxygen slag (BOS) which is obtained as by-product in the production of steel by the oxygen blowing process, LD slag which is obtained in the Linz-Donawitz process and electric furnace slag (EOS) which is obtained in steel production or steel recycling by means of an electric arc furnace. Further examples of steel slags are, for example, slags which are formed in further steel purification processes, for example slag from the ladle furnace, known as ladle slag. Steel slags typically have an apparent density of about 3.0-3.7 kg/l.

Further processes in which iron-containing slags can be formed are, for example, metallurgical processes for extraction of nonferrous metals. These slags are referred to as metallurgical slags and can have a high content of iron. One such metallurgical slag is copper slag which is obtained a by-product in the extraction of copper. Copper slags typically have a content of iron of more than 40% by weight, calculated as FeO. The iron in copper slags is typically present mostly in the form of iron silicate. Copper slags typically have an apparent density in the region of 3.7 kg/l.

Slags which are obtained in waste or sewage sludge incineration plants also often contain a high proportion of iron.

The iron-containing slag preferably comprises at least 8% by weight, more preferably at least 10% by weight, even more preferably at least 12% by weight, of iron, calculated as FeO and based on the weight of the iron-containing slag.

In particular, the iron-containing slag comprises from 8 to 70% by weight, preferably from 10 to 65% by weight, in particular from 12 to 60% by weight, especially from 15 to 35% by weight, of iron, calculated as FeO.

Such slags can improve the electrical and also thermal conductivity of the cured binder composition.

The iron-containing slag is preferably selected from the group consisting of steel slags, metallurgical slags and slags from waste incineration.

The iron-containing slag is preferably steel slag, in particular slag from an electric arc furnace, the casting ladle, the Linz-Donawitz process or the oxygen blowing process.

It is particularly advantageous for the iron-containing slag to be copper slag. Binder compositions containing copper slag have a significantly improved conductivity.

The iron-containing slag preferably has an apparent density of more than 3.0 g/l, in particular more than 3.2 g/l.

The iron-containing slag preferably has a content of free CaO of less than 1% by weight, preferably less than 0.5% by weight, based on the weight of the iron-containing slag. For the purposes of the present invention, free CaO is reactive calcium oxide which can react with water to form $Ca(OH)_2$.

The iron-containing slag advantageously displays a volume increase of less than 2%, preferably less than 1.5%, after 168 hours in dimensional stability testing in the steam test in accordance with DIN EN 1744-1.

The iron-containing slag can consist of different iron-containing slags. In a preferred embodiment of the invention, the binder composition comprises a plurality of iron-containing slags which differ in terms of their chemical composition, in particular in terms of their iron content. Optimization of the electrical properties of the material produced can be achieved thereby.

One suitable iron-containing slag contains the following main constituents:
- from 8 to 40% by weight, preferably from 10 to 35% by weight, in particular from 12 to 33% by weight, especially from 15 to 30% by weight, of FeO,
- from 20 to 50% by weight, preferably from 22 to 40% by weight, of CaO, with the content of free CaO preferably being less than 1% by weight,
- from 10 to 40% by weight, preferably from 15 to 30% by weight, of $SiO_2$,
- from 5 to 20% by weight, preferably from 7 to 15% by weight, of $Al_2O_3$,
- from 1 to 10% by weight, preferably from 2 to 8% by weight, of MgO,
- from 1 to 10% by weight, preferably from 2 to 8% by weight, of MnO and
- from 0 to 10% by weight of other materials, based on the total weight of the iron-containing slag.

A further suitable iron-containing slag contains the following main constituents:
- from 40 to 70% by weight, preferably from 45 to 65% by weight, in particular from 50 to 60% by weight, of FeO,
- from 0.5 to 15% by weight, preferably from 1 to 10% by weight, of CaO, with the content of free CaO preferably being less than 1% by weight,
- from 20 to 45% by weight, preferably from 25 to 40% by weight, of $SiO_2$ and
- from 0 to 10% by weight of other materials, based on the total weight of the iron-containing slag.

The moisture content of the iron-containing slag is preferably less than 5% by weight, more preferably less than 3% by weight, especially preferably less than 1% by weight, in particular less than 0.5% by weight.

For certain applications, it can be advantageous for the porosity of the iron-containing slag to be in the region of 5% by volume. In this way, the weight of the product can be reduced without having any great adverse effect on the end properties.

For certain applications, it can also be advantageous for the porosity of the iron-containing slag to be above 5% by volume so that the weight of the product can be reduced.

In the case of certain applications, especially for high-strength materials, it can be advantageous for the porosity of the slag to be below 5% by volume, preferably below 3% by volume.

The slag particles preferably have an irregular shape and/or surface and are in particular not spherical. This is advantageous, in particular, for intermeshing of the particles with one another and for a good bond with the binder.

In particular, the slag particles can have any nonspherical geometric shape, either uniform or nonuniform. For example, the particles can have a conical, polygonal, cuboid, pentagonal, hexagonal, octagonal, prismatic and/or polyhedral shape. Nonuniform particles can, for example, have circular, elliptical, oval, square, rectangular, triangular or polygonal cross sections, which are at least partially present therein. The expressions "nonuniformly" or "irregularly" shaped particles relate to three-dimensional particle shapes in which at least two different cross sections through the particles have a different shape. Illustrative cross sections through slag particles having an irregular shape are schematically shown in FIG. 1.

Slag, in particular slag from metal extraction or metal recycling, is typically separated off in the liquid state from the metal melt and stored for cooling, typically in slag beds. Cooling can be accelerated by, for instance, spraying with water. The cooling process can influence the physical properties, in particular the crystallinity and the grain size, of the slag.

A slag, in particular a steel slag, which has been cooled by means of water, in particular in slag beds, is advantageous. The relatively rapid cooling breaks the slag into small pieces.

A slag, in particular a copper slag, which has been granulated as slag stream by means of a pressurized water jet is likewise advantageous.

This can save energy for comminution and angular particles having a rough and/or uneven surface are typically obtained. In addition, any free CaO present is converted by contact with water into $Ca(OH)_2$, which is desirable.

For certain applications, it can also be advantageous, in particular for electrostatic shielding, for the iron-containing slag to have additional magnetic properties.

The iron-containing slag preferably has a particle size of not more than 16 mm, more preferably not more than 8 mm, even more preferably not more than 4 mm, especially not more than 3.5 mm. Preference is given to not more than 10% by weight of the iron-containing slag having a particle size below 0.06 mm.

The iron-containing slag especially preferably has a particle size of from 0.06 to 8 mm, preferably from 0.06 to 4 mm, more preferably from 0.06 to 3.5 mm. Slag particles having a suitable particle size can be obtained, for example, by fractionation, typically by sieving. The slag can optionally be comminuted by crushing and/or milling. Such processes are known to a person skilled in the art.

The particle size can be determined by a sieving method as described in DIN EN 933-1.

The slag advantageously has the same particle size distribution (sieving curve) or a comparable particle size distribution as the fillers which are usual for the particular application and are replaced by the slag. This can also be achieved by mixing suitable particle size fractions.

It can also be advantageous for a further material which has a high content of iron and is obtained, in particular, in steel forming to be mixed in addition to the iron-containing slag into the binder composition. Such a material is, for example, mill scale. Mill scale is a by-product which is obtained in the rolling of steel and typically contains 70-80% by weight or iron, calculated as FeO. The mill scale is preferably free of oil. In a preferred embodiment, the binder composition additionally comprises mill scale. The proportion of mill scale in the binder composition is preferably from 0.1 to 10% by weight, in particular from 1 to 8% by weight, based on the total weight of the dry binder composition.

Fillers are chemically inert, solid, particulate materials and are offered in various shapes, sizes and as different materials. Mineral fillers can vary from fine sand particles to large coarse stones. Particularly suitable fillers are sand, gravel, comminuted stones, calcined gravel or lightweight fillers such as, in particular, clay, pumice, perlite or vermiculite. Further suitable fillers are ground limestone, chalk, quartz flour, titanium dioxide, barite or aluminum oxide. It is advantageous to mix different fillers. The filler preferably comprises ground limestone, chalk, quartz flour, fine titanium dioxide, ground barite, fine aluminum oxide, limestone sand or silica sand, or mixtures thereof.

The particle size of the fillers depends on the particular application and can be up to 32 mm or more. The particle size is preferably not more than 16 mm, especially preferably not more than 8 mm. The particle size of the fillers is particularly preferably below 4 mm. In particular, the fillers have a particle size in the range from 0.1 µm to 3.5 mm. The particle size can be determined by a sieving method as described in DIN EN 933-1. It is advantageous to mix fillers of different particle sizes corresponding to the desired sieving curve. Suitable sieving curves for various applications are known to a person skilled in the art.

The binder composition preferably comprises at least one fine mineral filler, preferably having a particle size of not more than 0.1 mm, selected from the group consisting of ground limestone, chalk, quartz flour, fine titanium dioxide, ground barite, silica dust and fine aluminum oxide, and mixtures thereof.

The binder composition preferably contains slag having a particle size of more than 0.06 mm and a fine mineral filler which is not a slag and has a particle size of not more than 0.1 mm. The use of fine mineral fillers can, in particular, increase the density of the microstructure and thus contribute to improving the durability of a cured binder composition. In addition, the use of fine mineral fillers, in particular of calcium carbonate having a particle diameter of not more than 10 µm, can accelerate the strength development of the binder composition after addition of water.

The binder composition preferably contains no further fillers apart from slag and the fine mineral filler. Such binder compositions can be readily processed and give materials having good strength after curing.

Preference is given to a mass ratio of slag to the fine mineral filler of from 100:0 to 60:40, in particular from 95:5 to 70:30.

However, it can also be advantageous for the binder composition to contain slag as only filler. In this case, the slag comprises all mineral particles in the binder composition having a size of from about 0.1 µm to 1 mm, 2 mm, 4 mm, 8 mm or more. This is advantageous for an improved electrical conductivity and also an improved thermal conductivity of the cured binder composition and for maximum utilization of the slag.

In an advantageous embodiment of the invention, the binder comprises at least one mineral binder.

The mineral binder preferably comprises a binder which in the presence of water reacts in a hydration reaction to form solid hydrates or hydrate phases. It is, in particular, a hydraulic binder which can be cured even under water after addition of water, in particular cement or hydraulic lime, or a latent hydraulic binder which sets by interaction of admixtures with water, in particular slag sand, or pozzolanic binders, in particular fly ash, or a nonhydraulic binder, in particular calcium sulfate in the form of anhydrite or calcium sulfate hemihydrate.

The mineral binder is preferably selected from the group consisting of cement, gypsum plaster, quicklime, fly ash and slag sand.

The mineral binder preferably comprises at least one hydraulic binder, preferably a cement-based binder.

The mineral binder is particularly preferably a cement in accordance with DIN EN 197-1, a calcium sulfoaluminate cement or a calcium aluminate cement, or a mixture thereof. As cement, it is possible to use any available cement type or a mixture of two or more cement types, for example the cements classified under DIN EN 197-1: Portland cement (CEM I), Portland composite cement (CEM II), blast furnace slag cement (CEM III), pozzolanic cement (CEM IV) and composite cement (CEM V). Of course, cements which are produced according to an alternative standard, for example the ASTM standard or the JIS standard, are equally suitable.

The greatest preference is given to Portland cement or a cement containing Portland cement as per DIN EN 197-1. Portland cement is particularly readily available and makes it possible to produce materials having good mechanical properties.

It can also be advantageous for the mineral binder to contain other binders in addition to or instead of the cement. These are, in particular, latent hydraulic binders and/or pozzolanic binders. Suitable latent hydraulic and/or pozzolanic binders are, in particular, slag sand, fly ash and/or silica dust (amorphous $SiO_2$, fumed silica).

In an advantageous embodiment, the mineral binder contains finely milled slag sand, fly ash and/or silica dust, preferably in an amount of from 2 to 95% by weight, in particular from 5 to 65% by weight, particularly preferably from 10 to 40% by weight, based on the total weight of the mineral binder, in addition to Portland cement.

The content of cement in the binder composition is advantageously from 5 to 50% by weight, preferably from 10 to 45% by weight, based on 100% by weight of the dry binder composition.

In a preferred embodiment, the binder is Portland cement, optionally in combination with fly ash and/or finely milled slag sand.

An advantageous binder composition comprising cement contains:
from 5 to 50% by weight, preferably from 10 to 45% by weight, of cement, in particular Portland cement,
from 0 to 20% by weight, preferably from 2 to 10% by weight, of fly ash and/or finely milled slag sand,
from 0 to 10% by weight of gypsum plaster,
from 30 to 90% by weight, preferably from 45 to 85% by weight, of at least one mineral filler, with at least 20% by weight of the filler being iron-containing slag, and
from 0 to 5% by weight of further additives,
based on the total weight of the dry binder composition.

The binder advantageously comprises at least one epoxy resin and at least one hardener for the epoxy resin in addition to a hydraulic binder, in particular cement. The combination of an organic binder with a mineral binder enables the chemical and physical resistance of the cured binder composition to be improved.

Epoxy resins are low molecular weight or polymeric compounds bearing epoxide groups. Suitable epoxy resins for producing polymers are known in the prior art and are commercially available. If the epoxy resins are equipped with a defined number of epoxide groups per molecule, they preferably have at least two epoxide groups per molecule, for example two, three, four or more epoxide groups per molecule. If the epoxy resin is a polymer having a varying number of epoxide groups in the molecule, it has on average more than one epoxide group per molecule. The epoxy resin then preferably contains an average of at least two epoxide groups per molecule. According to the invention, it is possible to use mixtures of various epoxy resins, for example of two, three or more different epoxy resins.

The epoxy resin is preferably a liquid resin or a mixture comprising two or more liquid epoxy resins. The term "liquid epoxy resin" refers to a technical polyepoxide having a glass transition temperature below 25° C. The epoxy resin composition optionally additionally contains proportions of solid epoxy resin.

The epoxy resin is, in particular, a liquid resin based on a bisphenol, in particular a bisphenol A diglycidyl ether and/or bisphenol F diglycidyl ether, as are commercially available from, for example, Olin, Huntsman or Momentive. These liquid resins have a viscosity which is low for epoxy resins and allow rapid curing and formation of high-modulus and high compressive strength materials. They can contain proportions of bisphenol A solid resin or novolak glycidyl ethers.

At least one reactive diluent can advantageously be additionally mixed into the epoxy resin. Suitable reactive diluents are low-viscosity, aliphatic or cycloaliphatic compounds containing epoxide groups.

Furthermore, emulsifiers, in particular nonionic emulsifiers, can be mixed into the epoxy resin. This improves the emulsifiability in processing of the composition.

The epoxy resin is advantageously emulsified or dispersed in water. Commercial epoxy resin emulsions are especially suitable, in particular Sika® Repair/Sikafloor® EpoCem® Modul A (from Sika) or epoxy resin emulsions from manufacturers such as Huntsman, Dow or Momentive.

The epoxy resin reacts with a suitable hardener to give a solid. As hardeners, it is possible to use customary and known compounds which react with the epoxy groups. This crosslinks the epoxy resin. The hardeners are preferably basic hardeners, in particular amine compounds or amides.

The hardener is preferably a polyamine having at least three amine hydrogens which are reactive toward epoxide groups. Amine hydrogens are hydrogen atoms which are bound directly to an amine hydrogen atom and can react with epoxide groups.

The hardener preferably contains at least two primary or secondary amino groups per molecule. Amine compounds having two or more amino groups per molecule will hereinafter be referred to as "polyamines".

Polyamines are preferably present in the binder composition in such a way that the molar ratio of amine hydrogens to epoxide groups is in the range from 0.6 to 1.5, in particular from 0.8 to 1.2.

According to the invention, it is possible to use mixtures of various hardeners, for example of two, three or more different hardeners.

The amine having at least three amine hydrogens which are reactive toward epoxide groups is preferably a water-dilutable amine or a constituent of a water-dilutable amine mixture.

One suitable water-dilutable amine mixture comprises, in particular, a mixture of (i) diamines or polyamines, (ii) polyalkylene amines and (iii) amine-functionalized adducts of amines with epoxides.

The term "water-dilutable" means that a liquid forms a homogeneous mixture without phase separation when it is mixed with water.

Suitable amine hardness for the epoxy resin are commercially available, in particular as Sika® Repair/Sikafloor® EpoCem® Modul B (from Sika), Beckopox® EH 623w or Beckocure® EH 2100w/44WA (both from Allnex), Epilink® 701 (from Evonik), Incorez® 148/700 (from Incorez) or D.E.H.® 804 (from Dow). They can be used as such or be diluted with water.

An advantageous binder composition comprising at least one epoxy resin, at least one hardener for the epoxy resin and cement contains:
  from 1 to 10% by weight of at least one epoxy resin,
  from 0.5 to 5% by weight of at least one amine hardener,
  from 10 to 50% by weight, preferably from 12 to 35% by weight, of cement,
  from 0 to 5% by weight of fly ash and/or finely milled slag sand,
  from 40 to 70% by weight of at least one filler, in particular a mineral filler, with at least 20% by weight of the filler being iron-containing slag, and
  from 0 to 5% by weight of at least one additive,
based on the total weight of the dry binder composition.

An advantageous binder composition which comprises an epoxy resin, a hardener for the epoxy resin and a hydraulic binder is a three-component system. Here, one liquid component comprises the resin component, namely the epoxy resin, a second liquid component comprises the hardener component, namely the hardener, and a solid component comprises the fillers and the hydraulic binder. The resin component and/or the hardener component are preferably present in aqueous solution, suspension or emulsion and contain the water necessary for the reaction of the hydraulic binder. The three components are advantageously present separately from one another in separate containers before processing.

The mineral binder likewise preferably comprises at least one aluminum silicate and at least one alkali metal silicate. These react in the presence of water to form a geopolymer. Geopolymers are environmentally friendly building materials since significantly less $CO_2$ is formed in the production of their starting materials than in the production of Portland cement.

Suitable aluminum silicates are all aluminum silicates with the aid of which a geopolymer can be produced. Particularly suitable aluminum silicates are clay, calcined clay, fly ash, finely milled slag sand, zeolite, feldspar or mixtures thereof. Preferred aluminum silicates are selected from the group consisting of clay, calcined clay, fly ash and slag sand.

The term "clay" refers to water-containing aluminum silicate which is formed in weathering processes. Clays include kaolinite, bentonite, common clays and kaolinite clays.

The term "calcined clay" refers to the reaction product from the calcination of a clay mineral, for example metakaolin.

The term "fly ash" refers to a by-product from coal power stations which is filtered off from the exhaust air in the form of a fine powder.

The term "slag sand" refers to the predominantly amorphous, nonmetallic by-product obtained in pig iron production in a blast furnace.

Alkali metal silicate is also referred to as water glass and is a material of the formula $M_2O \ast n\, SiO_2$, where M is Na, K or Li and n is the ratio of $SiO_2$ to $M_2O$. Commercial alkali metal silicates typically have values of n in the range from about 0.5 to 4. Alkali metal silicate dissolved in water is an alkaline, clear, colloidal solution or a gel. Alkali metal silicates also include orthosilicates, $M_4O_4Si$ where n is 0.5, and metasilicates, $M_2O_3Si$ where n is 1.

In a preferred embodiment, the alkali metal silicate is a sodium and/or potassium silicate.

The alkali metal silicate preferably has a molar ratio of $SiO_2$ to $M_2O$ in the range from 0.8 to 2.4, preferably from 1.0 to 2.0, in particular from 1.4 to 2.0. This preferred ratio can have been set by addition of, for example, NaOH or KOH.

The alkali metal silicate for the geopolymer is preferably an aqueous alkali metal silicate.

The weight ratio of aluminum silicate to alkali metal silicate in this binder composition is preferably in the range from 6:1 to 2:1.

One advantageous binder composition in which the binder is a geopolymer after the curing reaction contains:
  from 10 to 70% by weight of mineral binder comprising at least one aluminum silicate and at least one alkali metal silicate, from 30 to 90% by weight of at least one filler, in particular a mineral filler, with at least 20% by weight of the filler being iron-containing slag, and from 0 to 5% by weight of further additives, based on the total weight of the dry binder composition.

The binder composition here is an at least two-component composition and comprises:

a powder component comprising the at least one aluminum silicate and the filler, and an aqueous component comprising the at least one alkali metal silicate.

The alkali metal silicate is preferably present as an aqueous solution comprising from 30 to 50% by weight of alkali metal silicate.

In a further advantageous embodiment of the invention, the binder comprises an organic binder, in particular at least one epoxy resin and at least one hardener for the epoxy resin or at least one polyisocyanate and at least one polyol, and is preferably free of mineral binders.

The binder advantageously comprises an epoxy resin and is free of mineral binders.

Suitable epoxy resins, reactive diluents and hardeners for the epoxy resin are compounds which have been described above. However, binder compositions which contain an epoxy resin as binder and are free of mineral binders are preferably essentially free of water.

One advantageous binder composition which comprises at least one epoxy resin and at least one hardener for the epoxy resin and is free of mineral binders contains:

from 5 to 20% by weight, preferably from 7 to 15% by weight, of at least one epoxy resin, from 0.8 to 7% by weight, preferably from 1 to 5% by weight, of at least one amine hardener, from 70 to 94% by weight, preferably from 75 to 92% by weight, of at least one filler, in particular a mineral filler, with at least 20% by weight of the filler being iron-containing slag, and from 0 to 10% by weight of further additives, based on the total weight of the dry binder composition.

An advantageous binder composition is in this case a three-component system. Here, one liquid component comprises the resin component, namely the epoxy resin, a second liquid component, namely the hardener component, comprises the hardener for the epoxy resin and a solid component comprises the fillers.

Suitable commercially available resin and hardener components for the epoxy resin are, for example, Sikadur®-42 Komponente A, containing the epoxy resin, and Sikadur®-42 Komponente B, containing the hardener, both obtainable from Sika.

The three components are advantageously present separately from one another in separate containers until processing.

It is also possible to integrate the filler into the resin components and/or the hardener component. In this case, the system is a two-component system.

The binder likewise advantageously comprises a polyisocyanate and at least one polyol and is free of mineral binders.

A polyisocyanate is a compound which contains two or more isocyanate groups. The term polyisocyanate here also comprises polymers containing isocyanate groups. Polyisocyanates give polyurethanes as a result of reaction with atmospheric moisture or with polyols. Here, the expression "polyurethane" refers to polymers which are formed by the diisocyanate polyaddition. These polymers can bear other groups, in particular urea groups, in addition to the urethane groups.

Preferred polyisocyanates are aliphatic, cycloaliphatic or aromatic diisocyanates, in particular hexamethylene 1,6-diisocyanate (HDI), 1-isocyanato-3,3,5-trimethyl-5-isocyanatomethylcyclohexane (isophorone-diisocyanate or IPDI), perhydrodiphenylmethane 2,4'- and/or 4,4'-diisocyanate ($H_{12}$MDI), diphenylmethane 4,4'-diisocyanate, optionally together with proportions of diphenylmethane 2,4'- and/or 2,2'-diisocyanate (MDI), tolylene 2,4-diisocyanate or mixtures thereof with tolylene 2,6-diisocyanate (TDI), mixtures of MDI and MDI homologs (polymeric MDI or PMDI) or oligomeric isocyanates.

A suitable polymer containing isocyanate groups is, in particular, obtained from the reaction of at least one polyol with a superstoichiometric amount of at least one polyisocyanate, in particular diisocyanate, preferably MDI, TDI, IPDI or HDI.

Suitable polyols are, in particular, the following commercial polyols or mixtures thereof:

polyether polyols, in particular polyoxyalkylene diols and/or polyoxyalkylene triols. Preferred polyether polyols are polyoxypropylene diols, polyoxypropylene triols or ethylene oxide-terminated (EO-end-capped) polyoxypropylene diols or triols.

polyester polyols, also referred to as oligoesterols, produced by known methods, in particular polycondensation of hydroxycarboxylic acids or lactones or polycondensation of aliphatic and/or aromatic polycarboxylic acids with dihydric or polyhydric alcohols. Particularly suitable polyester polyols are polyester diols.

polycarbonate polyols as can be obtained by reaction of, for example, the abovementioned alcohols—used for formation of the polyester polyols—with dialkylcarbonates, diaryl carbonates or phosgene.

block copolymers bearing at least two hydroxyl groups and having at least two different blocks having a polyether, polyester and/or polycarbonate structure of the above-described type, in particular polyether polyester polyols.

polyacrylate and polymethacrylate polyols, polyhydroxy-functional fats and oils, also referred to as fatty acid polyols, polyhydrocarbon polyols, also referred to as oligohydrocarbonols, epoxidized vegetable oils and reaction products thereof with monofunctional alcohols, polybutadiene polyols, reaction products of vegetable oils, in particular castor oil, with ketone resins, polyester polyols based on hydrogenated tall oil, polyester polyols based on dimeric fatty acids or dimeric fatty alcohols, alkoxylated polyamines.

When the binder composition comprises a polyisocyanate, it preferably comprises at least one aromatic polyisocyanate and at least one polyol selected from the group consisting of epoxidized vegetable oils and reaction products thereof with monofunctional alcohols, polybutadiene polyols, reaction products of vegetable oils, in particular castor oil, with ketone resins, polyester polyols based on hydrogenated tall oil and polyester polyols based on dimeric fatty acids or dimeric fatty alcohols.

In this case, combinations of polyisocyanates and polyols as are described in EP 3 339 343 and EP 3 415 544 are especially advantageous.

Such binder compositions are particularly hydrophobic, do not absorb any moisture after curing and are hydrolysis-stable, which is advantageous.

An advantageous binder composition comprising at least one polyisocyanate and at least one polyol contains:
- from 3 to 40% by weight of at least one polyisocyanate,
- from 3 to 40% by weight of at least polyol,
- from 60 to 94% by weight of at least one filler, in particular a mineral filler, with at least 20% by weight of the filler being iron-containing slag, and
- from 0 to 15% by weight of at least one further additive, based on 100% by weight of binder composition.

One advantageous binder composition comprising polyisocyanates and polyols is a three-component system. Here, one liquid component comprises the polyisocyanate, a second liquid component comprises the polyol and a solid component comprises the filler.

It is also possible to integrate the filler into the component comprising the polyisocyanate or into the component comprising the polyol. In this case, the binder composition is a two-component composition.

In a further advantageous binder composition, the binder composition comprises at least one polyisocyanate, at least one polyol and at least one cement.

Such a binder composition consists, in particular, of three components. A first component contains the at least one polyisocyanate, a second component contains the at least one polyol and a third component (powder component) contains the fillers and the cement.

For certain applications, it can be advantageous for the binder composition of the invention to contain from 0.1 to 5% by weight, based on the total weight of the binder composition, of electrically conductive powders or fibers, in particular carbon black, graphite, steel fibers or carbon fibers. The electrical conductivity of the material can be increased thereby.

The binder composition is preferably free of carbon-based admixtures, in particular carbon black, graphite, carbon fibers or carbon nanotubes, and free of metallic admixtures such as metal powders or metal fibers.

The binder composition can, depending on use and binder type, optionally contain one or more additives, in particular
- plasticizers, especially concrete plasticizers or superplasticizers, in particular anionic comb polymers having polyalkylene glycol side chains, especially comb polymers having carboxylic acid groups and polyalkylene glycol groups (polycarboxylate ethers),
- retarders for cement hydration, in particular hydroxycarboxylic acids or salts thereof,
- accelerators for cement hydration, in particular crystallization nuclei, for example fine or ultrafine CSH, gypsum, $CaCO_3$ or $Ca(OH)_2$ particles, nitrites, nitrates, chlorides, sulfates, carbonates, fluorides, oxides or hydroxides of alkali metals or alkaline earth metals, organic amines, in particular hydroxyalkylamines, or mixtures thereof,
- accelerators for an epoxy resin-hardener reaction,
- catalysts for an isocyanate-polyol reaction, in particular metal-organic compounds or amines, in particular secondary or tertiary amines,
- rheological auxiliaries, in particular cellulose ethers or esters or bacterial polysaccharides,
- film-forming polymers, as aqueous polymer dispersion or as redispersible polymer powder, in particular polymers having a maximum film formation temperature of less than 25° C., for example homopolymers or copolymers of acrylic esters, copolymers of styrene and butadiene, copolymers of styrene with acrylic esters and homopolymers or copolymers of vinyl acetate,
- polymer powders, in particular superabsorbents,
- fibers, in particular synthetic fibers,
- thickeners, pumping aids, shrinkage reducers, corrosion inhibitors, air pore formers, antifoams, wetting agents, emulsifiers, dispersants, dyes, unreactive diluents, pigments, softeners or preservatives.

The additive can in the case of multicomponent systems be present in any component suitable for this purpose.

The binder composition can be present as one-component, two-component or multicomponent composition.

In the present document, a "one-component" composition is a composition in which all constituents of the composition are present in the same container and which is storage-stable as such and can be cured by means of water.

In the present document, the adjectives "two-component" and "multicomponent" refer to a composition in which the constituents of the composition are present in two or more different components. Here, at least those constituents of the composition which can react with one another are stored in separate containers or in separate compartments of a container and are mixed with one another only shortly before application of the composition.

In the case of one-component compositions, processing of the binder composition is carried out by mixing the binder composition with a suitable amount of water. In the case of two-component or multicomponent binder compositions, all components are mixed in a suitable order and amount, optionally with addition of a suitable amount of water. Processing of this type is known to a person skilled in the art.

In the processing of binder compositions which contain a hydraulic or latent hydraulic binder, the mass ratio of water to hydraulic binder after mixing of all components is in the range from 0.25 to 1.0, preferably from 0.28 to 0.8, in particular from 0.30 to 0.6. The water is advantageously added to such binder compositions only shortly before processing.

In binder compositions comprising one, two or more components, the water is preferably already present in one or more of the components. The water-containing components here do not comprise any constituents which can react with the water under normal storage conditions.

The present invention further provides a process for producing materials having an improved electrical conductivity at 20° C., characterized in that all constituents of a binder composition comprising at least one binder and at least one mineral filler are mixed and the mixture is allowed to cure, with at least 20% by weight of the filler being iron-containing slag and water being present in the mixing of binder compositions which contain a mineral binder.

It can also be advantageous, in particular for the use of the binder composition of the invention as equalizing mortar, screed or floor coating, for a binder composition according to the invention which comprises organic binders and to which no water is added to be mixed and applied in the following steps:
- mixing of all components of the binder composition apart from the fillers having a particle size of more than 0.06 mm using suitable mixing appliances,
- application of the mixture as equalizing mortar, screed or floor coating and
- sprinkling of the fillers having a particle size of more than 0.06 mm, where at least 20% by weight of the fillers are iron-containing slag, by hand or using a suitable apparatus.

The material having improved electrical conductivity preferably has a specific electrical volume resistance which is reduced by at least a factor of 1.5, more preferably at least 1.8, in particular at least 2.0, compared to an otherwise identical material which, however, contains a silica sand having the same particle size instead of the iron-containing slag. The electrical resistance is determined between the two opposite 40×40 mm faces of a 40×40×160 mm prism by application of a voltage of 100 mV and a frequency of 1 kHz, at 20° C. The measurement of the specific electrical volume resistance is carried out on test specimens which contain at least one mineral binder, after storage for 28 days at 20° C. and 57% relative atmospheric humidity and on test specimens which contain only organic binders after storage for 7 days at 20° C. and 57% relative atmospheric humidity.

In a preferred embodiment, curing of the binder composition is carried out with application of an electric potential to electrodes which are installed on or embedded in the binder composition to be cured. Since the electrical conductivity of the material is increased by the slag, heat can be generated by the application of a voltage to the electrodes, and this accelerates the curing reaction.

The present invention further provides a material which has an improved electrical conductivity at 20° C. and is obtainable by mixing all constituents of a binder composition comprising at least one binder and at least one mineral filler and allowing the resulting mixture to cure, with at least 20% by weight of the mineral filler being iron-containing slag.

The invention further provides for the use of the material having an improved electrical conductivity at 20° C., as described above, for the production of sacrificial anodes, in particular in building works. For the use for producing sacrificial anodes, the binder is preferably a mineral binder, in particular a binder which is a geopolymer after curing.

The invention further provides for the use of the material having an improved electrical conductivity at 20° C., as described above, as mortar, repair mortar, equalization mortar, screed, embedding mortar, render, grout, coating, in particular floor coating, or equalizing composition.

BRIEF DESCRIPTION OF THE FIGURES

FIG. 1 shows: a schematic depiction of illustrative cross sections of slag particles having an irregular shape.

EXAMPLES

Working examples which are intended to illustrate the invention as described are presented below. Of course, the invention is not restricted to these working examples described.

"Ref." means reference example

"Ex." means example according to the invention.

Materials

All sands and slags were dried before use and divided by sieving into the desired particle size fractions. The particle size fractions were subsequently mixed in such a way that the particle size distribution of the sands used corresponded to a prescribed particle size distribution (sieving curve).

EOS sand is an electric furnace slag from Stahl Gerlafingen, Switzerland. The material used had an apparent density of about 3.3 kg/l and a content of iron, calculated as FeO, of about 19% by weight.

CS is NAstra® iron silicate granules, a vitreous copper slag, obtainable from Sibelco, Germany, having an apparent density of about 3.7 kg/l and a content of iron, calculated as FeO, of about 51% by weight.

HOS is a blast furnace lump slag from Hüttenwerke Krupp Mannesmann, Germany, obtainable from Hermann Rauen GmbH & Co., Germany. The material used had an apparent density of 2.9 kg/l and a content of iron, calculated as FeO, of about 3% by weight.

Raulit® is a blast furnace slag from DK-Recycling and Roheisen GmbH, Germany, obtainable under the tradename Raulit®-Mineralbaustoffgemisch from Hermann Rauen GmbH & Co., Germany. The material used had an apparent density of about 2.9 kg/l and a content of iron, calculated as FeO, of about 1% by weight.

HS is a slag sand from voestalpine AG, Austria. The material used had an apparent density of about 2.9 kg/l and a content of iron, calculated as FeO, of less than 1% by weight.

Sikadur®-42 HE is a three-component embedding mortar based on epoxy resin, obtainable from Sika Schweiz AG.

Determination of the Specific Electrical Surface Resistance ($R_{OF}$)

The electrical surface resistance of the test specimens was measured at regular time intervals. For this purpose, the resistance was determined on one of the longitudinal surfaces of a 40×40×160 mm test specimen using the resistance measuring instrument Resipod, obtainable from Proceq, Switzerland. This is a 4-point measuring instrument. The electrodes are arranged linearly at a spacing of 50 mm. An electric current is applied to the outer electrodes and the potential difference between the inner two electrodes is measured. The current amplitude is selected automatically by the instrument as a function of the electrical resistance of the specimen and is typically in the range from 10 to 200 µA. This method corresponds to AASHTO 95-11. To avoid contact problems between electrodes and surface, the surface at which the measurement was carried out was briefly wetted with a sponge impregnated with saturated $Ca(OH)_2$ solution before each measurement.

Determination of the Specific Electrical Volume Resistance ($R_{DU}$)

The specific volume resistance of the 40×40×160 mm test specimens was determined by the EIS method. For this purpose, stainless steel electrodes were applied to the ends (40×40 mm faces) of the test specimens so as to completely cover the faces. In order to ensure good contact between test specimen and electrode, a sponge which had been impregnated with a saturated calcium hydroxide solution was in each case clamped between test surface and electrode. The volume resistance of the test specimens was subsequently determined over a period of about 15 seconds by application of an amplitude signal of 100 mV with a frequency of 1 kHz or 10 kHz to the two stainless steel electrodes.

Determination of Flexural Tensile Strength and Compressive Strength

The flexural tensile strength and the compressive strength of test specimens having a size of 40×40×160 mm was determined in accordance with DIN EN 196-1.

1. Cement Mortars

The composition of the mortars is indicated in Table 1. The compositions of the mortars differ only in terms of the sand used. The particle size distribution of the sands and the additives added were the same in all mixtures.

TABLE 1

| Composition of the mortars | |
|---|---|
|  | Amount in % by weight |
| Cement (type CEM I) | 33.5 |
| Silica sand or slag sand 0.06-2.2 mm | 60 |
| Ground limestone | 4 |
| Additives | 2.5 |

Production and Storage of the Test Specimens

The dry constituents of the mortars, as indicated in Table 1, were homogeneously mixed. Water was subsequently added in such an amount that a W/C (weight ratio of water to cement) of 0.45 was obtained. The fresh mortar was well and homogeneously mixed for 3 minutes using a mechanical mixer. The processability of the mortars M1 to M4 was comparable. The mortars were introduced into steel molds having a size of 40×40×160 mm and stored covered in the formwork for 24 hours at 20° C. The test specimens were then taken from the formwork and stored at 57% relative atmospheric humidity at 20° C. or at 68% relative atmospheric humidity at 20° C.

Table 2 shows the specific electrical surface resistance $R_{oF}$ of the mortars M1 and M2 in kΩ·cm as a function of the storage time and relative atmospheric humidity (r.h.). The specimen age is the age of the test specimens in days. The measured values are averages of measurements on in each case three test specimens.

TABLE 2

|  | Ref. 1 | Ex. 1 | | Ref. 2 | Ex. 2 | |
|---|---|---|---|---|---|---|
|  | \multicolumn{6}{c}{Mortar} | | | | | |
|  | M1 | M2 | | M1 | M2 | |
|  | \multicolumn{6}{c}{Sand} | | | | | |
|  | Silica | EOS | | Silica | EOS | |
|  | Specific resistance | | | Specific resistance | | |
| Specimen age [days] | $R_{OF}$ [kΩ · cm] | | Factor* | $R_{OF}$ [kΩ · cm] | | Factor* |
|  | \multicolumn{3}{c}{Storage at 57% r.h.} | \multicolumn{3}{c}{Storage at 68% r.h.} | | | | |
| 7 | 66 | 36 | 1.8 | 56 | 35 | 1.6 |
| 14 | 92 | 50 | 1.8 | 83 | 48 | 1.7 |
| 21 | 109 | 60 | 1.8 | 94 | 56 | 1.7 |
| 28 | 369 | 75 | 4.9 | 118 | 69 | 1.7 |

*Factor by which the specific electrical surface resistance of the material according to the invention is reduced in comparison with the reference material (resistance of M1/resistance of M2)

Table 3 shows the specific electrical volume resistance $R_{DU}$ of the mortars M1 to M4 after storage of the test specimens at 57% relative atmospheric humidity.

TABLE 3

|  | Ref. 3 | Ref. 4 | | Ex. 3 | | Ex. 4 | |
|---|---|---|---|---|---|---|---|
|  | \multicolumn{7}{c}{Mortar} | | | | | | |
|  | M1 | M3 | | M2 | | M4 | |
|  | \multicolumn{7}{c}{Sand} | | | | | | |
|  | Silica | HOS | | EOS | | CS | |
| Sample age days] | Spec. resistance $R_{DU}$ [kΩ · cm] | [kΩ · cm] | F* | [kΩ · cm] | F* | [kΩ · cm] | F* |
| 28 | 28.0 | 32.0 | 0.9 | 10.2 | 2.7 | 7.0 | 4.0 |

*F = Factor by which the specific electrical volume resistance of the mortars M2, M3 and M4 has been reduced in comparison with reference mortar M1 (resistance of M1/resistance of M2, M3 or M4)

It can be seen from Tables 2 and 3 that the mortars M2 and M4, which contain the iron-containing steel slag, have a significantly lower specific electrical resistance than the mortars M1 and M3. A lower electrical resistance means a better electrical conductivity.

Table 4 shows the compressive strength of the test specimens in MPa after storage at 21° C. and 68% relative atmospheric humidity.

TABLE 4

|  | Ref. 5 | Ex. 5 |
|---|---|---|
| Mortar | M1 | M2 |
| Sand | Silica | EOS |
| Age of the test specimens [days] | \multicolumn{2}{c}{Compressive strength [MPa]} | |
| 1 | 22 | 26 |
| 7 | 50 | 54 |
| 28 | 66 | 71 |

2. Embedding Mortar Based on Epoxy Resin Sikadur®-42 HE component A (containing the epoxy resin) was mixed well in a weight ratio of 3:1 with the associated component B (containing the hardener) and a solid component having the composition indicated in Table 5 was subsequently added and mixed in well. The weight ratio of component A to component B to solid component was 3:1:34.

Table 5 shows the composition of the solid component.

TABLE 5

| Constituent | % by weight |
|---|---|
| Mixture of ground limestone and ground barite, <0.1 mm | 24.9 |
| Silica sand or slag sand 0.12-3.2 mm* | 74.6 |
| Polycarboxylate ether* solution (20% by weight of polycarboxylate ether dissolved in 80% by weight of benzyl alcohol) | 0.5 |

*comb polymer with carboxylic acid groups and polyethylene glycol side chains

Table 6 shows the strength, the type of sand used and the specific volume resistance ($R_{DU}$) of the mortars M5 to M10 after storage of the test specimens at 20° C. and 57% relative humidity for 7 days.

TABLE 6

|  | Ref. 6 | Ref. 7 | Ref. 8 | Ref. 9 | Ex. 6 | Ex. 7 |
|---|---|---|---|---|---|---|
| Mortar | M5 | M6 | M7 | M8 | M9 | M10 |
| Sand | Silica | HOS | Raulit | HS | EOS | CS |
| Compressive strength [MPa] | 103.9 | 117.2 | 116.3 | 113.2 | 120.3 | 115.9 |
| Flexural tensile strength [MPa] | 26.3 | 26.8 | 28.2 | 27.0 | 29.9 | 31.2 |
| Specific electrical resistance $R_{DU}$ [MΩ · cm] at 1 kHz | 175 | 121 | 137 | 187 | 40 | 27 |
| Factor* |  | 1.4 | 1.3 | 0.9 | 4.3 | 6.5 |
| Specific electrical resistance $R_{DU}$ [MΩ · cm] at 10 kHz | 17 | 12 | 14 | 21 | 5.2 | 3.1 |
| Factor* |  | 1.4 | 1.2 | 0.8 | 3.2 | 5.5 |

*Factor by which the specific electrical volume resistance of the mortars M6 to M10 has been reduced in comparison with reference mortar M5 (resistance of M5/resistance of the mortar containing slag)

3. Thermal Conductivity of an Embedding Mortar M11 According to the Invention

Sikadur®-42 HE component A (resin component based on epoxy resin) was mixed well in a weight ratio of 3:1 with the associated component B (hardener component based on amine hardener). A solid component consisting of:
- 252 g of EOS sand having a particle size of 0.12-0.25 mm,
- 86 g of a mixture of ground limestone and ground barite having a particle size of less than 0.1 mm and
- 1.4 g of commercial wetting agent were subsequently mixed well into 40 g of this epoxy mixture.

Test specimens having a diameter of 30 mm and a height of 2 mm were produced by casting into appropriate molds and allowing to cure at 20° C. for 7 days.

The thermal conductivity of the embedding mortar M11 was 2.06 W/(m·K). This is significantly higher than the thermal conductivity of a cured commercial, filler-free epoxy resin of typically 0.20 W/(m·K).

The invention claimed is:

1. A method comprising:
   preparing a mixture including a binder composition comprising at least one binder and at least one mineral filler, and
   curing the mixture to produce a material having improved electrical conductivity at 20° C., wherein:
   the at least one binder comprises at least one epoxy resin and at least one hardener for the epoxy resin or at least one polyisocyanate and at least one polyol and is free of mineral binders,
   the binder composition comprises at least 85% by weight of the at least one mineral filler, based on a total dry weight of a dry binder composition,
   at least 60% by weight of the at least one mineral filler is iron-containing slag, and
   the improved electrical conductivity is present when the electrical resistance of the cured mixture is decreased by a factor of at least 1.5 compared to a cured material which has a same composition as the cured mixture but contains silica sand instead of the iron-containing slag whereby the silica sand and the iron-containing slag are of a same particle size, wherein the electrical resistance is a surface resistance measured according to AASHTO 95-11 or a volume resistance measured according to an electrochemical impedance spectroscopy (EIS) method.

2. The method as claimed in claim 1, wherein the binder composition comprises at least 95% by weight of the at least one mineral filler, based on the total weight of the dry binder composition.

3. The method of claim 1, wherein the iron-containing slag comprises at least 8% by weight of iron, calculated as FeO, based on the weight of the iron-containing slag.

4. The method of claim 1, wherein the iron-containing slag is steel slag, or slag from an electric arc furnace, a casting ladle, a Linz-Donawitz process or an oxygen blowing process.

5. The method of claim 1, wherein the iron-containing slag is copper slag.

6. The method of claim 1, wherein the iron-containing slag has a particle size of not more than 16 mm.

7. The method of claim 1, wherein the binder composition comprises fine filler having a particle size of not more than 0.1 mm, the fine filler being selected from the group consisting of ground limestone, quartz flour, fine titanium dioxide, ground barite, silica dust and fine aluminum oxide, and mixtures thereof.

8. The method as claimed in claim 1, wherein the binder composition comprises from 85% to 95% by weight of the at least one mineral filler, based on the total dry weight of the dry binder composition.

9. A process for producing materials having an improved electrical conductivity at 20° C. in which all constituents of a binder composition comprising at least one binder and at least one mineral filler are mixed and the mixture is allowed to cure,
   wherein at least 60% by weight of the at least one filler is iron-containing slag and water is present during mixing of binder compositions which contain a mineral binder,
   the binder composition comprises at least one epoxy resin and at least one hardener for the epoxy resin or at least one polyisocyanate and at least one polyol and is free of mineral binders, and
   the binder composition comprises at least 85% by weight of the at least one mineral filler, based on a total dry weight of the binder composition.

10. The process as claimed in claim 9, wherein the curing of the binder composition occurs with application of an electric potential to electrodes which are installed or embedded in the binder composition to be cured.

11. A material having an improved electrical conductivity at 20° C. obtained by the process as claimed in claim 9.

12. A method comprising preparing a sacrificial anode that comprises the material as claimed in claim 11.

13. A method comprising applying the material as claimed in claim 11 to a substrate, the material being applied as mortar, repair mortar, equalization mortar, screed, embedding mortar, render, grout, coating, floor coating, or equalizing composition.

* * * * *